AM-FM RADIO RECEIVER
Filed Sept. 27, 1961
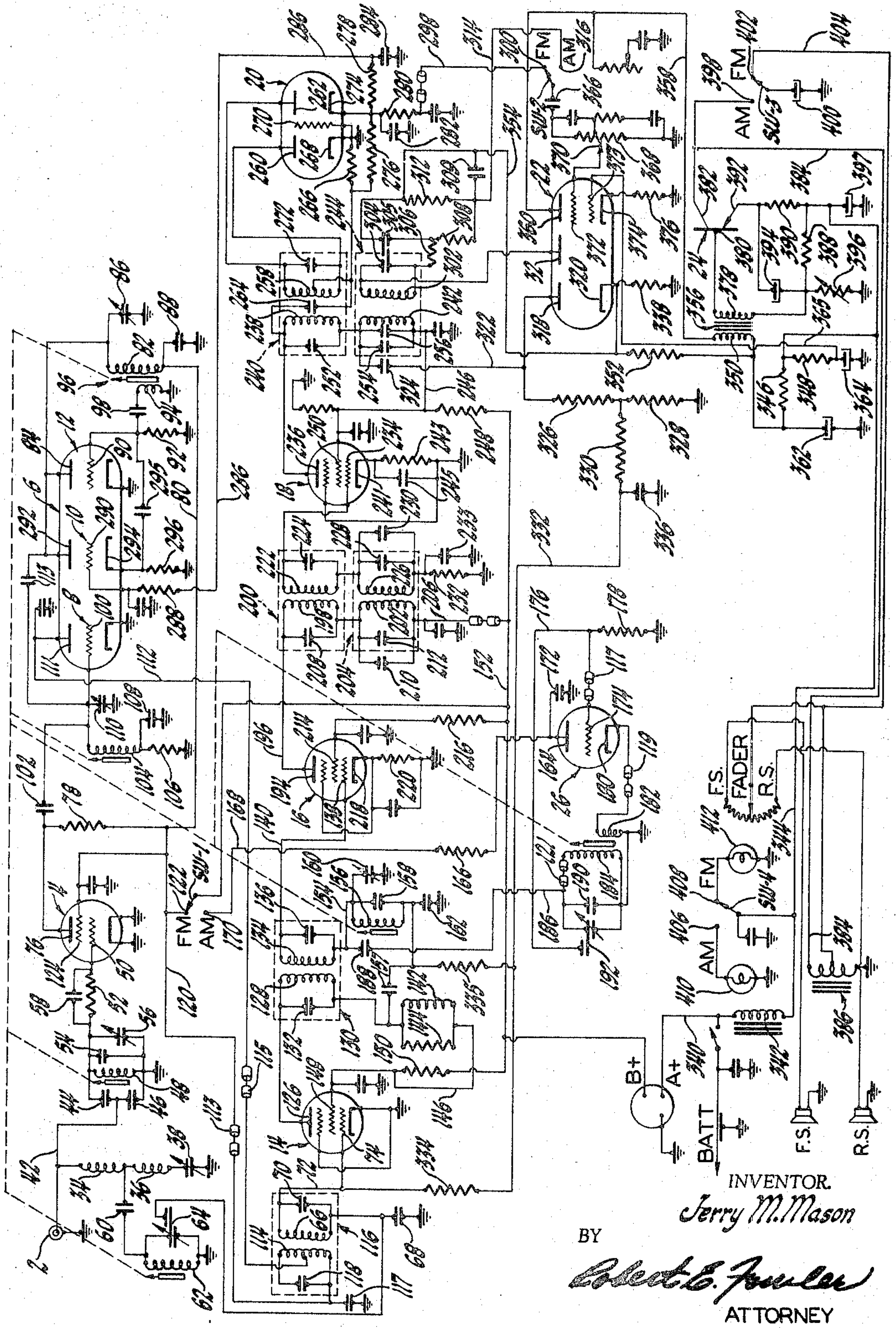
INVENTOR.
Jerry M. Mason
BY
Robert E. Fowler
ATTORNEY United States Patent Office 3,206,680
Patented Sept. 14, 1965

3,206,680
AM-FM RADIO RECEIVER

Jerry M. Mason, Kokomo, Ind., assignor to General Motors Corporation, Detroit, Mich., a corporation of Delaware Filed Sept. 27, 1961, Ser. No. 141,189
6 Claims. (Cl. 325—315)

This invention relates to radio receiving apparatus and more particularly to a combined AM-FM radio receiver primarily intended for automotive use.

Most of the automotive radio receivers currently on the market in this country are adapted for AM reception. There are a few converter units which adapt the AM receivers for FM reception and a few foreign imports.

It is an object in making this invention to provide a simple combination AM-FM radio receiver with a minimum of switching required between AM and FM operation.

It is a further object in making this invention to provide an AM-FM radio receiver in which no mechanical switching is necessary in the antenna RF or IF amplifier circuits.

It is a still further object in making this invention to provide a combined FM limiter and AM IF amplifier section requiring no mechanical switching.

With these and other objects in view which will become apparent as the specification proceeds, my invention will be best understood by reference to the following specification and claims and the illustrations in the accompanying drawings, in which:

The figure is a circuit diagram of an AM-FM radio receiver embodying my invention.

Referring now more particularly to the drawing, it is noted that the receiver as shown includes eight tubes and a transistor. Some of the tube electrodes, of course, could be combined in a single envelope, if desired, to reduce the total number of tubes. A single antenna is used which provides a signal for either type reception and that is connected at point 2. For FM reception the signal is fed through RF amplifier tube 4 to tube 6 which incorporates three sections. The lefthand triode section 8 is a mixer section, the central section 10 is a reactance control for the automatic frequency control, and the third section 12 is an oscillator to heterodyne the incoming FM carrier frequency down to 10.7 megacycles. The output of the FM mixer section 8 is fed to the input of the first FM IF amplifier including tube 14, thence through the IF amplifiers including tubes 16 and 18 to the discriminator tube 20. The output of the discriminator is fed into a first AF amplifier tube 22 and then through a final audio power amplifier stage including transistor 24 before the rectified and amplified signal is applied to the receiver speaker system.

For AM reception the signal is received on the same antenna 2 but because its carrier frequency is different, it is segregated and applied to the first RF amplifier stage for AM signals which includes the same tube 14 used as an IF amplifier for FM. This amplifies the incoming waves. A local oscillator including tube 26 generates waves of a frequency to heterodyne with the incoming carrier waves in the circuit including tube 16 and reduces the frequency to the desired IF frequency of 262.5 kc. This reduced frequency IF signal is then applied to a common IF amplifier stage including tube 18. The amplified AM signal is then detected at diode 32, amplified through the first stage of audio amplification including tube 22, then power amplifier transistor 24 and is lastly applied to the speaker system.

It is to be noted that there are only four switches actuated in changing from AM to FM operation and that one of these is only for energizing suitable indicating lights to inform the operator of the type of reception for which the receiver is adjusted. These switches SW–1, SW–2, SW–3 and SW–4 are ganged together and operate simultaneously.

There is no switch in the antenna circuit, the different frequencies of the carrier signals of the AM and FM signals alone cause them to be properly isolated and routed to the first RF amplifier stage for the given type signal. The antenna 2 is connected through two choke coils 34 and 36 in series and a variable series trimmer condenser 38 to ground. The antenna circuit is connected directly to the FM RF tuned circuit by line 42 which is connected to a point between condensers 44 and 46 in series across tunable inductance coil 48. This inductance coil 48 is tuned by a comminuted core which is movable with respect thereto as diagrammatically indicated. One end of the inductance coil 48 is grounded and its opposite end is connected to the control grid 50 of tube 4 through resistance 52. A first fixed condenser 54 and a second adjustable condenser 56 are each connected in shunt to the inductance coil 48 to complete the tunable RF input circuit. Bypass condenser 58 is connected in shunt to series input resistance 52.

The connection of the antenna circuit to the AM RF tuned circuit is through coupling condenser 60, one terminal of which is connected to a point intermediate choke coils 34 and 36 and the other terminal connected to one side of a resonant circuit including a tunable coil 62 and condenser 64 connected in parallel. The opposite side of the tunable circuit is grounded. Coil 62, as in the case of coil 48, is tuned by movement of a comminuted core which can be inserted into or withdrawn from said coil. Condenser 64 is adjustable but once it has been trimmed or adjusted it is normally left in that condition. One plate of the multi-plate condenser 64 is connected to one side of secondary coil 66 of transformer 116 and to ground through a bypass condenser 68. Condenser 70 connected across transformer winding 66 tunes this coil to a desired frequency. The opposite side of the transformer secondary winding 66 is connected through line 72 directly to control grid 74 of tube 14.

As an FM signal is received upon the antenna it is fed directly through the tuned circuit consisting of inductance coil 48 and its associated condensers 44, 46, 54 and 56 and applied to the control grid 50 of tube 4. It is prevented from feeeding directly into tube 14 and its associated tuned circuit by choke coil 34 which acts as a choke and has a high impedance to FM signal frequency. Coil 62 and capacitor 64 have a low impedance to this frequency. Choke 36 and condenser 38 are tuned to the 10.7 mc. FM IF frequency and present a low impedance thereto for the purpose of preventing signal energy on antenna 2 at this frequency from being coupled to tube 14 so that only IF signals from the FM tuner are applied to said tube. Choke 34 also serves to reject this frequency by virtue of its relatively high impedance thereto. For AM signal frequency the choke 34 has a low impedance and, therefore, this frequency will pass and the choke 36, capacitor 38 combination has a high impedance to the AM signal frequencies and, therefore, the AM signal will be impressed properly on the input circuit to tube 14 acting as an RF amplifier as desired. The output from the first RF amplifier stage of the FM section appears on plate 76 of tube 14 which is connected through a resistance 78 to the power supply and line 80 which extends to one end of a transformer winding 82. This latter connection provides power to a local oscillator which generates a beat frequency to heterodyne with the incoming frequency and produce the desired 10.7 mc. IF frequency which appears at the output of the mixer stage. The oscillator includes the last section 12 of the tube 6, the plate 84 being coupled directly to a tank circuit including one terminal of the tuning inductive primary winding 82 of transformer 96 and is also connected to ground through an adjustable condenser 86, the opposite terminal of tuning winding 82 being connected to ground through a fixed condenser 88. The control grid 90 of this section of the tube is connected to ground through biasing resistance 92 and through coupling condenser 98 to feedback secondary winding 94 of the transformer 96, the opposite terminal of which is grounded. The transformer has two functions. It provides the feedback coupling from the output to the input of the oscillator. It likewise provides the variable inductance for changing the frequency of oscillation of the oscillator through the use of a tuning slug or comminuted core adjustment as diagrammatically indicated.

The first section 8 of the tube 6 performs the functions of a mixer stage and grid 100 thereof is directly coupled to the plate 76 of RF stage 4 through a coupling condenser 102 and to one side of a tuning coil or inductance 104. A resistance 106 is connected between the opposite side of the tuning inductance 104 and ground which resistance is shunted by bypass condenser 108. A variable capacitance 110 is connected between grid 100 and ground to complete the resonant tuned section between the RF and mixer stages. The tuning coil 104 is tuned by so-called slug tuning, the use of a comminuted movable core. The oscillator 12 is coupled to the mixer stage through interelectrode capacities of the tube 6 and by condenser 113. Thus when operating as an FM receiver the three coils 48, 104 and 82 are simultaneously tuned as indicated by the dashed line connection to tune the antenna, RF and oscillator sections of the high frequency amplifier. Coils 62, 156, 182 and 184 are tuned simultaneously but have no effect upon reception of FM frequencies.

The output of the mixer stage is taken off of plate 111 of section 8 of tube 6 and then conducted through line 112 connected thereto, to a tap on primary 114 of coupling transformer 116. This injects the FM IF signal into this stage of amplication when the set is operating as an FM receiver since the signals are coupled from primary 114 to the secondary 66. A condenser 118 connected in shunt across primary 114 tunes the primary to the proper IF frequency. It is thus seen that tube 14 and its associated circuits either act as an IF amplifier for FM operation or as an RF amplifier for AM operation. The lower connection of the primary 114 is connected to a bypass condenser 117 and through line 120 with a stationary contact 122 of switch SW–1 to obtain a source of B+ power. This contact supplies power to the plate 76 and screen grid 124 of tube 4 as well as to various elements of the tube 6.

The next two stages including the tubes 16 and 18 are intermediate frequency amplifier stages for FM reception and the stage including tube 18 includes two separate frequency differentiating channels for the designed FM (10.7 megacycles) and AM (262.5 kc.) intermediate frequencies. By the time the FM signals reach this location they have already been heterodyned down to the indicated intermediate frequency. This is not, however, true of the AM signals since they have merely passed through one stage of RF amplification. It is, therefore, necessary to provide a local oscillator at this point for AM receiver operation. Such an oscillator is provided through tube 26 and its associated circuitry.

First, tracing the coupling for the FM IF amplifier it is seen that plate 126 of tube 14 is connected to one side of primary winding 128 of IF coupling transformer 130 which primary is tuned to the intermediate frequency for FM by a condenser 132 connected in shunt therewith. The secondary 134 of IF transformer 130 is in similar manner tuned to the same intermediate resonant frequency by shunt condenser 136. The lower terminal of primary winding 128 is connected to a network formed by condensers 157 and 162 which are connected in series to ground. The lower terminal of primary winding 128 is also connected to the upper terminal of choke 142, which is untuned and shunted by resistor 144. The lower terminal of choke 142 is connected by line 146 to screen grid 148 of tube 14 for proper power supply. The screen grid is connected through a limiting resistor 150 to the main B+ line 152. The lower terminal of the secondary 134 of the FM IF coupling transformer 130 is connected through line 154 to capacitor 160. The upper terminal of tuning inductance 156 is connected to condenser 160 and the lower terminal to condenser 162. Condenser 158 also shunts tuning inductance 156. This tuning inductance together with associated condensers 158, 160 and 162 forms a resonant circuit tuned to the AM RF frequency. However, for FM IF reception the aforementioned network composed of condensers 157 and 162 act as bypass condensers for FM IF as does condenser 160, thus rendering inoperative the aforementioned RF tuned circuit at the FM IF frequency.

As before stated for AM operation a locally generated frequency is necessary for heterodyning with the carrier frequency to reduce the same to the value of the desired intermediate frequency. In this case this is accomplished by beating the RF frequency at this point with the locally generated frequency available from the oscillator including tube 26. The oscillator tube 26 has a plate 164 which is connected through resistance 166 to a line 168 extending to a fixed contact 170 on switch SW–1 which provides B+ power to that plate when the switch SW–1 is in the proper position. A bypass condenser 172 is connected between the plate 164 and ground. The control grid 174 of tube 26 is connected to line 176 and also through biasing resistance 178 to ground. The cathode 180 of tube 26 is connected through feedback winding 182 to ground, said feedback winding being inductively coupled to a primary tuning winding 184 one terminal of which is grounded and the other of which is connected through line 186 and a coupling condenser 188 to line 154 to inject the oscillator signal into the system at that point. The primary tuning winding 184 is tuned by the two condensers, first a fixed condenser 190 connected directly thereacross and a second adjustable condenser 192 connected in shunt to the first. This second condenser 192 also has a connection to line 176 previously described. Coil 184 is tunable as were the previously described coils by movement of a comminuted core or slug to change the frequency of its resonant circuit and thus tune the oscillator. When operating as an AM set, therefore, the three coils 62, 156 and 184 tune the antenna, RF and oscillator circuits simultaneously for proper operation.

It is to be noted that there are ferrite beads 113 and 115 shown on lines 120 and 112, respectively, leading into transformer 116. Ferrite beads 117, 119 and 121 are shown on the grid, cathode and tuning coil leads of the local oscillator tube 26 and are shown in various other parts of the circuit also. These present a relatively high impedance to the 10.7 megacycle FM IF and higher frequencies but practically none to the AM signal frequencies. They serve as RF chokes to provide decoupling at the FM signal and intermediate frequencies where necessary.

The output of both intercoupling circuits feeds into control grid 138 of tube 16 regardless of whether the set is operating as an FM or AM receiver and applies the signal to this amplifying stage. In this stage either signal is amplified selectively without switching through different frequency selected channels and is impressed on the next tube 18. In accomplishing this the plate 194 of the tube 16 is connected through line 196 with the upper terminal of transformer primary 198 of FM IF transformer 200, the lower terminal of which is connected to the upper terminal of primary 202 of AM IF transformer 204. The lower terminal of primary 202 is connected directly through conductive line 206 with B+ power line 152.

Thus the two primary coils 202 and 198 are in series between the power supply B+ and the plate 194 of tube 16. Primary winding 198 is tuned to the FM IF frequency by shunt condenser 208 and primary 202 of transformer 204 is in like manner tuned to the AM IF frequency by a pair of parallel condensers 210 and 212 in shunt to primary 202. The screen grid 214 of tube 16 is connected through biasing resistor 216 with the B+ power line 152. Cathode 218 is connected to ground through biasing resistor 220.

The secondary winding 222 of transformer 200 is tuned by shunt condenser 224 and secondary winding 226 of transformer 204 is tuned by two parallel condensers 228 and 230. The lower terminal of secondary winding 226 is connected to ground through biasing resistor 232 shunted by bypass condenser 233. The common output of this coupling circuit feeds into the control grid 234 of the tube 18 which is directly connected to the upper terminal of transformer secondary 222 to feed in a signal representing either AM or FM input. This stage acts as an FM limiter stage and an AM IF amplifier stage. The plate 236 of tube 18 is directly connected to the upper terminal of primary 238 of FM IF transformer 240 and the lower terminal of the secondary winding 238 is directly conductively connected in series to the upper terminal of primary winding 242 of AM IF transformer 244. The cathode 241 of tube 18 is connected to ground through biasing resistor 243 shunted by condenser 245. The value of the resistance determines the initial point of limiting action. The lower terminal of primary winding 242 is directly connected through line 246 and limiting resistor 248 to the B+ power line 152 and also to the screen grid 250 of the tube 18. The primary windings 238 and 242 are tuned to the resonant FM and AM IF frequencies by condensers 252, 254 and 256, respectively.

The secondary winding 258 of the transformer 240 has its outside terminals connected to two anodes 260 and 262 in the duo-diode tube 20. This portion of the receiver is, of course, the discriminator and detects the FM signal. The upper terminal of the primary winding 238 is capacitatively coupled through condenser 264 to one end of resistance 266 and thence to ground. The cathode 268 of the lefthand diode in tube 20 is also directly connected to ground as is a shield 270 in the tube. The lefthand end of the resistance 266 is also connected to a center tap on the secondary 258. Condenser 272 shunts the secondary 258 and tunes the same to the desired center frequency of the discriminator. Cathode 274 in the righthand half of the tube 20 is connected to a common point of connection of three resistances 276, 278 and 280. This point is also bypassed to ground through condenser 282. The remaining terminal of resistance 276 is connected to resistance 266 and the remaining terminal of resistance 278 is bypassed to ground through condenser 284 and also connected through line 286 and resistor 288 to controll grid 290 of the central section 10 of the tube 6. This is for automatic frequency control purposes and section 10 of tube 6 varies the reactance in this circuit. The plate 292 of this section is directly connected to the plate 84 from whence it receives its power and the cathode 294 is connected through biasing resistor 296 to ground. Cathode 294 is capacitatively coupled to the oscillator through condenser 295. The signal developed on line 286 is applied to grid 290. As the discriminator goes positive the reactance of this tube section 10 increases which will tend to lower the oscillator tank frequency to which it is coupled. If the discriminator goes negative the reverse happens to control the oscillator frequency. As the frequency modulates about a central frequency, therefore, a variable D.C. signal is developed upon line 298 and applied to stationary contact 300 of switch SW–2 to which audio amplification means are connected.

Tracing through the remainder of the AM IF amplifier section, the secondary 302 of transformer 244 is tuned to the resonant IF frequency by condenser 304. The lower terminal of the secondary 302 is connected through two resistances 306 and 308 in series to line 314 which extends to stationary terminal 316 of the switch SW–2. The upper terminal of the secondary 302 is directly connected to the detector anode 32 which in cooperation with one of the cathodes of the tube 22 detects the amplitude modulated signal and develops a varying voltage of audio frequency on resistance 312. Resistances 306 and 308 together with condensers 305 and 309 filter the 262.5 kc. IF variations from the detected audio voltage.

The portion of the tube 22 to the left consists of a diode including anode 318 and cathode 320 used to develop the automatic gain control voltage in the presence of AM signals. The anode is connected to a line 322 capacitatively coupled through condenser 324 to the upper terminal of primary winding 242. The other end of line 322 is connected through two series resistors 326 and 328 to ground and across these two resistances the automatic gain control voltage is developed. An intermediate point between these two resistors is connected through resistance 330 to the automatic gain control line 332, back through resistance 334 to the control grid 74 of the first tube 14 and through resistance 335 to grid 138 of tube 16 for the described purposes. Bypass condenser 336 is connected between line 332 and ground to give the proper time constant response of the system. Cathode 320 is connected through biasing resistor 338 to ground to properly fix bias the automatic gain control. FM intermediate frequencies are shunted to ground by the tuning condensers 254 and 256 shunted across primary winding 242 thus rendering this AGC inoperative when receiving FM signals.

An A+ power line 340 is connected to a terminal of the supply plug and extends to a suitable choke coil 342 which is also connected to line 344. This line is connected to filter condenser 397 and also to the junction of resistors 346 and 348, and to the junction of resistors 388 and 390. The remaining terminal of resistor 348 is connected to the upper terminal of bypass capacitor 364 whose other terminal is grounded. The junction of resistor 348 and condenser 364 is connected to line 365 whose other end is connected to grid 373 of tube 22 supplying a filtered source of power thereto. The remaining terminal of resistor 346 connects to the upper terminal of condenser 362 whose lower end is grounded. The junction of resistor 346 and condenser 362 is connected to the lower terminal of primary winding 350 of audio coupling transformer 356 whose upper terminal is connected through line 358 to the plate 360 of audio amplifying tube 22, thus supplying a source of power and providing a path for the audio signal. Resistor 352 is connected to the junction of resistor 346 and condenser 362. Its other end is connected to resistor 338 and cathode 320 of tube 22 supplying a source of bias thereto. The movable switch arm of switch SW–2 is capacitatively coupled through condenser 366 to one end of a resistor 368 the opposite end of which is grounded. A movable contact 370 movable over said resistor 368 is directly connected to the control grid 372 of the first audio amplifier stage. The movement of contact 370 acts as a volume control for the set and this connection applies a rectified signal, either FM or AM to the first audio amplifier stage. The cathode 374 of this stage is connected to ground through a biasing resistor 376.

The output from the first stage of audio amplification which appears on line 358 is coupled through transformer 356 to secondary 378, one terminal of which is connected directly to the base electrode 380 of the transistor 24 and impresses the signal thereon. The collector electrode 382 of this transistor is directly connected through line 384 with the upper terminal of an output transformer 386 for feeding the speaker system. The opposite side of the transformer is grounded. The other side of the transformer secondary winding 378 is connected through two resistors 388 and 390 in series to the emitter electrode 392 to complete the input circuit to the transistor. A condenser 394 is connected in shunt across the two resistances. The lower terminal of the secondary 378 is also connected to ground through variable resistance 396 for biasing purposes. The collector electrode 382 of the transistor 24 is likewise directly connected to stationary contact 398 of switch SW–3 and when engaged by that switch this contact is connected to ground through bypass condenser 400. A second stationary contact 402 of the switch SW–3 is connected through line 404 with a fader control for varying the amount of signal going to front and rear seat speakers. This particular portion forms no part of the present invention and will not be described in detail.

Line 344 is directly connected to the movable switch arm of switch SW–4 which oscillates between two stationary contacts 406 and 408. An illuminable bulb 410 is connected between contact 406 and ground and a second similar bulb 412 between stationary contact 408 and ground and either one or the other will be energized depending upon whether the set is adjusted for AM or FM operation and will indicate the manner of reception.

The receiver will operate to reproduce sound from either frequency modulated (FM) or amplitude modulated (AM) carrier waves. In order to change from the reception of one type to the other the switches SW–1, SW–2, SW–3 and SW–4 which are ganged to move together have to be thrown. These switches are shown in the position for FM reception. The switch SW–1 applies B+ electrical power to the RF amplifier and local oscillator portion of the FM portion. Switch SW–2 connects the output of the discriminator section to the first stage of audio amplification and simultaneously opens the circuit from the AM detector to the first audio amplifier stage. Switch SW–3 connects the tap of the audio output transformer primary to ground through a peaking condenser which extends the audio frequency response and switch SW–4 causes energization of lamp bulb 412 indicating FM operation.

When the switches are thrown to the opposite position for AM operation switch SW–1 supplies operating power for local oscillator 26, switch SW–2 disconnects the discriminator from the first audio amplifier stage and connects the AM detector thereto so that the AM signal is now amplified through the audio amplifier section, switch SW–3 now connects the outside terminal of audio output transformer to ground through the peaking condenser which reduces the audio response and lastly switch SW–4 completes an energizing circuit for lamp bulb 410 to indicate AM operation.

There is no mechanical switching in the antenna circuit and the selection of paths through this section due to the frequency of the carrier waves has been described. Likewise there are no mechanical switches in the IF portion, the frequencies again setting the proper amplification paths automatically.

In the stage including tube 18 the operation is somewhat different. This stage acts as a limiter stage for FM amplification but only as a normal IF amplifier stage for AM operation. This is accomplished by designing a relatively high limiting threshold and providing sufficient AGC to the AM signal only so that it never exceeds this threshold. The threshold or that point at which tube 18 begins its limiting action is determined by the value of the cathode bias resistor 243. Until sufficient signal strength is applied to grid 234 to exceed the cathode bias no grid current will flow and no limiting action will be obtained. For all AM operation a sufficient AGC voltage is developed on line 332 and applied to both tubes 14 and 16 through resistances 334 and 335 to prevent the signal from exceeding the value so only normal amplification is obtained. However, on FM operation not only are there two more stages of amplification added, namely tubes 4 and 8, but also there is no AGC developed since that is generated in the AM channel only. Therefore, the FM signals are strong enough to exceed the cathode bias of tube 18 and a limiting action on FM is obtained.

I have, therefore, provided a simple combination AM-FM radio receiver with a minimum of switching necessary to change from one type operation to the other.

What is claimed is:

1. In combination AM and FM radio receiving apparatus, a single receiving antenna, a first high frequency amplifying means tunable to pass waves having frequencies within a first band directly connected to said antenna to amplify waves having frequencies within the first band, mixing means connected to the first high frequency amplifying means to generate intermediate frequency waves, a filter choke section connected to the antenna including components having high impedance values at frequencies within the first band of frequencies and low impedance values at the intermediate frequency, a second high frequency amplifying means tunable to pass waves having frequencies within a second band spaced at some distance from the first band and having a low impedance to said first band of frequencies connected to mixing means and to the filter choke section at a point between the components having high impedance values at frequencies within the first band and low impedance at the intermediate frequency so that incoming waves will be amplified by either the first or second high frequency amplifying means depending upon the frequency of the waves being received without the necessity of any mechanical switching.

2. In combination AM and FM radio receiving apparatus, a receiving antenna, a first radio frequency amplifying means tunable over the FM frequency band directly connected to the receiving antenna, mixing means connected to the first radio frequency amplifying means to generate intermediate frequency waves, a second radio frequency amplifying means tunable over the AM frequency band, filter choke means including components having high impedance at FM frequencies and low impedance at the intermediate frequency connected to the receiving antenna and to the second radio frequency amplifying means to block the FM frequency waves from the antenna to the second radio frequency amplifying means and trap intermediate frequency waves so that incoming FM waves will be applied to the first radio frequency amplifying means and AM frequency waves to the second radio frequency amplifying means and the proper radio frequency amplifying means will automatically be employed without any mechanical switching.

3. In combination AM and FM radio receiving apparatus, antenna means for receiving either AM or FM signals within spaced frequency bands, a first radio frequency amplifying means tunable over the FM frequency band connected to the antenna means to receive signals therefrom, a first local oscillator connected to the first radio frequency amplifying means to produce a wave frequency to heterodyne with the incoming FM wave and produce an IF wave of a first frequency for FM reception, a second radio frequency amplifying means tunable over the AM frequency band connected to the antenna means, a second local oscillator connected to the second radio frequency amplifying means to produce a wave frequency to heterodyne with the incoming AM wave and produce an IF wave of a second frequency for AM reception, a multi-stage amplifying means permanently connected to the first and second radio frequency amplifying means to amplify the AM and FM IF waves developed thereby and having two frequency selective channels, one for passing the FM IF frequency signals and the second for passing the AM RF and IF frequency signals so that either FM signals or AM signals can be received and amplified through the common amplifying means without mechanical switching in said multi-stage amplifying means, discriminator means connected to the output of the IF channel for passing FM signals to convert those signals to audio frequency signals, detector means connected to the output of the IF channel for passing AM signals to convert those signals to audio frequency signals, audio amplifying means and switching means connected to the audio amplifying means, the discriminator means and the detector means to alternately connect the audio amplifying means either to the discriminator means or the detector means depending upon which type of signal is being received.

4. In combination AM and FM radio receiver apparatus, antenna means for receiving either AM or FM signals within spaced frequency bands, a first radio frequency amplifying means tunable over the FM frequency band connected to the antenna means to receive signals therefrom, a first local oscillator connected to the first radio frequency amplifying means to produce a wave frequency to heterodyne with the incoming FM wave and produce an IF wave of a first frequency for FM reception, a second radio frequency amplifying means tunable over the AM frequency band connected to the antenna means, a second local oscillator connected to the second radio frequency amplifying means to produce a wave frequency to heterodyne with the incoming AM wave and produce an IF wave of a second frequency for AM reception, a multi-stage amplifying means permanently connected to the first and second radio frequency amplifying means to amplify the AM and FM IF waves developed thereby and having two spaced frequency selective channels, one for passing the FM IF frequency signals and the second for passing the AM RF and IF frequency signals so that either FM signals or AM signals can be received and amplified through the common amplifying means without mechanical switching in said multi-stage amplifying means, discriminator means connected to the output of the IF channel for passing FM signals to convert those signals to audio frequency signals, detector means connected to the output of the IF channel for passing AM signals to convert those signals to audio frequency signals, audio amplifying means, switching means connected to the audio amplifying means, the discriminator means, and the detector means to alternately connect the audio amplifying means either to the discriminator means or the detector means depending upon which type of signal is being received, a source of electrical power, switching means connected to the source of electrical power and to the first and second local oscillator means to alternately energize one or the other, said second switching means being mechanically ganged to move with the first switching means to condition the system for either AM or FM reception.

5. In combination AM and FM radio receiving apparatus, antenna means for receiving either AM or FM signals within spaced frequency bands, a first radio frequency amplifying means tunable over the FM frequency band connected to the antenna means to receive signals therefrom, a first local oscillator connected to the first radio frequency amplifying means to produce a wave frequency to heterodyne with the incoming FM wave and produce an IF wave of a first frequency for FM reception, a second radio frequency amplifying means tunable over the AM frequency band connected to the antenna means, a second local oscillator connected to the second radio frequency amplifying means to produce a wave frequency to heterodyne with the incoming AM wave and produce an IF wave of a second frequency for AM reception, a multi-stage amplifying means having two spaced frequency selective channels permanently connected to the first and second radio frequency amplifying means to amplify the AM and FM IF waves developed thereby, one of said spaced frequency selective channels for passing the FM IF frequency signals and the second for passing the AM RF and IF frequency signals so that either FM signals or AM signals can be received and amplified through the common amplifying means without mechanical switching in said multi-stage amplifying means, cathode biasing means for the last stage of the IF amplifying means, automatic gain control means connected to the output of the frequency selective channel for passing AM IF signals and to the second radio frequency amplifying means and earlier stages of the amplifying means to control the gain of these stages when an AM signal is being received so that the signal amplitude will not exceed the cathode bias on the last stage of the IF amplifying means but when operating on FM signals the automatic gain control will not be effective and the FM signal will be amplified to a point where the last stage of the IF amplifier acts as a limiter.

6. In a combination AM and FM radio receiver having an FM RF amplifier section and an AM RF amplifier section a common multi-stage IF amplifier section permanently connected to both the FM RF amplifier section and the AM RF amplifier section, said common IF amplifier section including a first channel tuned to the FM intermediate frequency, a second channel tuned to the AM intermediate frequency and a single electronic amplifying means having an input and an output circuit the input circuit being connected to both the first and second channels, biasing means for the electronic amplifying means, automatic gain control means connected to the output of the IF amplifier section and to the AM RF amplifier section and operative only when an AM signal is being received to control the amplitude of the signal applied to the electronic amplifier means, said electronic amplifier means acting as an IF amplifier for AM signals and a limiter for FM IF signals applied thereto from the FM RF amplifier section when said automatic gain control means in ineffective.

References Cited by the Examiner

UNITED STATES PATENTS

| | | | |
|---|---|---|---|
| 2,295,383 | 9/42 | Carlson | 325—383 |
| 2,873,360 | 2/59 | Lyman | 325—491 |

FOREIGN PATENTS

| | | |
|---|---|---|
| 315,398 | 2/34 | Italy. |
| 448,851 | 6/48 | Canada. |
| 448,852 | 6/48 | Canada. |

DAVID G. REDINBAUGH, *Primary Examiner.*

(OVER)

UNITED STATES PATENT OFFICE

CERTIFICATE OF CORRECTION

Patent No. 3,206,680 September 14, 1965

Jerry M. Mason

It is hereby certified that error appears in the above numbered patent requiring correction and that the said Letters Patent should read as corrected below.

Column 8, line 40, for "FM frequency" read -- FM radio frequency --.

Signed and sealed this 5th day of April 1966.

SEAL)

Attest:

ERNEST W. SWIDER
Attesting Officer

EDWARD J. BRENNER
Commissioner of Patents